US009856606B2

(12) United States Patent
Tausche et al.

(10) Patent No.: US 9,856,606 B2
(45) Date of Patent: Jan. 2, 2018

(54) ENZYMATIC PRE-TREATMENT OF MARKET PULP TO IMPROVE FIBER DRAINAGE AND PHYSICAL PROPERTIES

(75) Inventors: James Tausche, Atlanta, GA (US); Jianhua Ma, Alpharetta, GA (US); Paul Tausche, West Hartford, CT (US)

(73) Assignee: Enzymatic Deinking Technologies, L.L.C., Norcross, GA (US)

( * ) Notice: Subject to any disclaimer, the term of this patent is extended or adjusted under 35 U.S.C. 154(b) by 0 days.

(21) Appl. No.: 13/323,136

(22) Filed: Dec. 12, 2011

(65) Prior Publication Data
US 2013/0146239 A1    Jun. 13, 2013

(51) Int. Cl.
| D21C 5/02 | (2006.01) |
| D21H 21/10 | (2006.01) |
| D21C 5/00 | (2006.01) |
| D21H 11/14 | (2006.01) |
| D21H 21/18 | (2006.01) |
| D21H 11/20 | (2006.01) |
| D21H 17/00 | (2006.01) |

(52) U.S. Cl.
CPC .............. *D21H 21/10* (2013.01); *D21C 5/005* (2013.01); *D21C 5/02* (2013.01); *D21H 11/14* (2013.01); *D21H 11/20* (2013.01); *D21H 17/005* (2013.01); *D21H 21/18* (2013.01); *Y02W 30/648* (2015.05)

(58) Field of Classification Search
CPC .............................. D21C 5/005; D21H 17/005
USPC .......................................................... 162/72
See application file for complete search history.

(56) References Cited

U.S. PATENT DOCUMENTS

| 5,110,412 A | 5/1992 | Fuentes | |
| 5,487,812 A * | 1/1996 | Thornton | D21C 9/002 |
| | | | 162/190 |
| 5,507,914 A | 4/1996 | Sarkar | |
| 5,620,565 A | 4/1997 | Lazorisak | |
| 6,066,233 A | 5/2000 | Olsen | |
| 6,238,516 B1 * | 5/2001 | Watson et al. | 162/8 |
| 6,267,841 B1 * | 7/2001 | Burton | 162/24 |
| 6,635,146 B2 | 10/2003 | Lonsky | |
| 6,808,595 B1 | 10/2004 | Burns | |
| 6,939,437 B1 | 9/2005 | Hill | |

(Continued)

FOREIGN PATENT DOCUMENTS

WO    0068500    3/2000

OTHER PUBLICATIONS

EDT, Enzymatic Deinking Technologies, https://web.archive.org/web/20091031091109/http://www.edt-enzymes.com/energyreduction.html, Oct. 31, 2009.*

(Continued)

*Primary Examiner* — Eric Yaary
(74) *Attorney, Agent, or Firm* — Pabst Patent Group LLP

(57) ABSTRACT

Methods for reducing the effects of wetlapping, drying, and hornification of pulp fibers and consequently increasing the pulp drainage and strength properties in the final product (i.e., paper) are provided. The method which has been developed creates a "value-added" product by the wastepaper supplier or at the pulp and/or deinking (recycled paper) mill—a wastepaper load/bale, wet pulp stock or wet lap, or dried pulp treated with or impregnated with enzymes that enhance the quality of the pulp or paper product when it is repulped and processed at the paper mill.

23 Claims, 2 Drawing Sheets

(56) References Cited

U.S. PATENT DOCUMENTS

| | | | |
|---|---|---|---|
| 7,067,244 B2 | 6/2006 | Jiang | |
| 2002/0088575 A1* | 7/2002 | Lonsky et al. | 162/72 |
| 2004/0123962 A1* | 7/2004 | Shannon et al. | 162/9 |
| 2005/0000666 A1* | 1/2005 | Taylor et al. | 162/24 |
| 2006/0048908 A1* | 3/2006 | Wang et al. | 162/199 |
| 2006/0102299 A1* | 5/2006 | Elgarhy et al. | 162/5 |
| 2006/0249265 A1* | 11/2006 | Scarpello et al. | 162/90 |
| 2007/0062654 A1* | 3/2007 | Wang et al. | 162/72 |
| 2007/0074832 A1* | 4/2007 | Ampulski | 162/109 |
| 2007/0111920 A1 | 5/2007 | Baur | |
| 2010/0112242 A1* | 5/2010 | Medoff | 428/22 |
| 2011/0168344 A1 | 7/2011 | Klein | |
| 2012/0322997 A1* | 12/2012 | Demuner | D06M 16/003 536/56 |

OTHER PUBLICATIONS

International Search Report and Written Opinion for PCT/US2012/068965 mailed Mar. 20, 2013.

\* cited by examiner

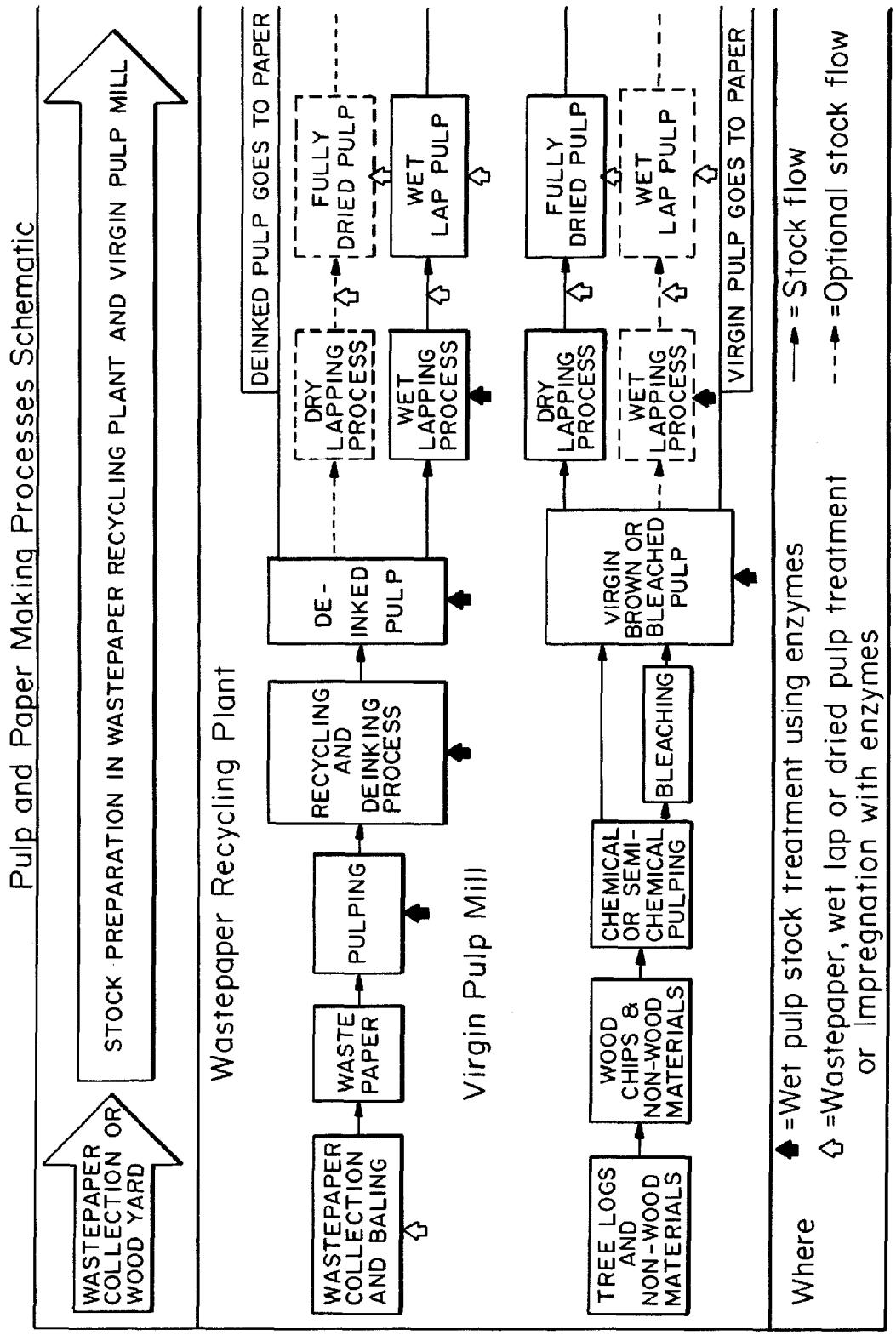

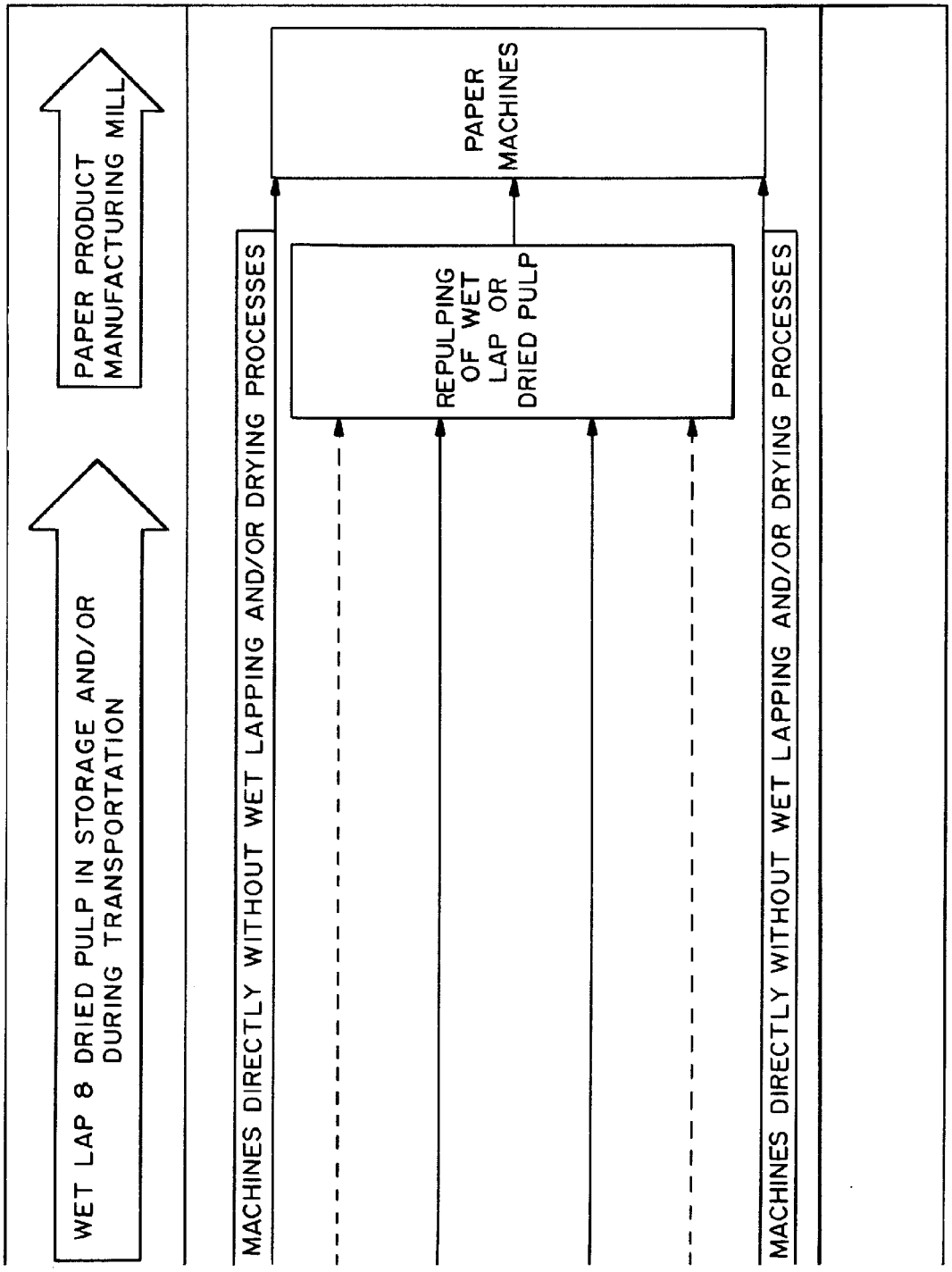

ENZYMATIC PRE-TREATMENT OF MARKET PULP TO IMPROVE FIBER DRAINAGE AND PHYSICAL PROPERTIES

FIELD OF THE INVENTION

The present invention is generally in the field of treating pulp, including wet lap or fully dried pulp, at virgin pulp and/or waste paper recycling mills and/or treatment or impregnation of dry furnish loads or bales with enzymes prior to wetting in a wastepaper processing plant for the purpose of combating the hornification/deterioration of pulp quality through the wet-lapping, drying and recycling processes and producing a greater value virgin or recycled pulp for the eventual user of the pulp product.

BACKGROUND OF THE INVENTION

Current methods of producing virgin pulp utilize large manufacturing facilities (pulp mills) that produce pulp for multiple end users. Pulp mills process pulp from softwood, hardwood logs or chips or non-wood sources into fibers which are used in the manufacture of paper. Methods of processing virgin pulp to remove lignin to varying degrees range from purely mechanical methods such as grinding logs and wood chips into individual fibers, to chemical treatments of the tree chips or non-wood fibrous materials. These methods result in pulp fibers with different optical, physical, and archival properties.

Virgin pulp produced in the pulp mill is commonly used in one of three ways: 1) within a short time frame following production, in a liquid stock form; 2) in wet lap form in which the liquid pulp is dewatered to approximately 45-50% solids for later use; or 3) in a dry lap form, which is dried pulp having approximately 90-95% solids. Pulp used within a short time (i.e., (1) or dewatered (i.e., (2)) are collectively, "never dried". The dry lap form and also wet lap form may be traded and transported for use in making paper at a later time, which may be from one to three days after pulping or after transport, sale, or storage for a period of three months or more. The majority of commercial market bleached pulp is made into dry lap or once-dried pulp, while recycled, market deinked pulp (MDIP) mills commonly produce recycled pulp in either wet lap form or fully dried form. After the fully dried or wet lapped pulp is shipped to a paper, tissue, or paper board mill, it is re-pulped with water and made into paper products. The quality of pulp or fibers deteriorates during the wet-lapping, drying or repulping processes. One way in which the pulp deteriorates is known as hornification, which includes reduced drainage, lowered water absorbance, decreased strength, stiffer fibers and greater fines content.

The time between pulp manufacture and re-pulping of the once-dried market virgin pulp varies greatly (e.g., from only a few days to potentially several years) while the typical time for wet lapped market pulps is from a few days to six months due to higher chances of mold growth and spoilage due to the higher moisture content. Any grade of paper may be produced from the market virgin or recycled pulps. Examples include fine printing and writing papers, cardboard, linerboard, corrugated paperboard, corrugated containers, boxes, tissue and towels. Each of these grades requires the pulp to have certain physical and chemical properties as well as operational properties of the stock such as good drainage. An important physical property is paper strength. The physical properties of never-dried or never-thickened (i.e., never wet lapped), wet-lapped, and fully-dried pulps differ greatly depending on type of fibers. Normally, the thickening or wet-lapping process and drying process horrify and crush the fibers, and materially worsen the strength properties. The never-dried or never-thickened pulp provides the greatest strength and drainage properties followed by wet-lapped pulp with the fully-dried pulp having the lowest measures of tensile and burst strength for each pulp fiber type and worst pulp drainage properties. The drying process further impairs sheet bulk.

Paper mills employ physical and chemical methods to provide the necessary physical and operational properties required to optimize the production and economic parameters of paper manufacture. The point/time of application of these drainage and strength treatments (i.e., shortly before application of the pulp into the paper machine) is important because it preserves fiber physical properties and may employ strategies such as charge deployment for which timing is critical.

One example of a physical strength enhancement approach is mechanical refining. Mechanical refining is conducted by applying energy to drive metal plates or other metallic shapes with extremely small inter-plate tolerances such that fibers are fibrillated as they are pushed through the plates. Fibrillating the fibers is especially important in the preparation of virgin fibers that are otherwise too "stick-like" and lack the necessary micro fibrils to form the key physical entanglements, greater inter-fiber surface area, and hydrogen bonding sites that provide the important strength aspects of sheets. Micro fibrils created from refining can be damaged through time, especially in the pressing and drying process. Consequently, most printing and writing and tissue/towel manufacturers that need further strength development, perform the mechanical refining to virgin and recycled pulps, and perform the mechanical refining of the pulps immediately before introduction into the paper machine. The major objective is to increase the fibrillation amount on fibers for better strength and at the same time to maintain a certain level of drainage, since refining hurts the drainage. For example, fibrils "catch" water and make it move more slowly through the sheet. Further, fibers are cut and shortened following mechanical refining.

Chemicals used to treat pulp in order to create the necessary physical and operational properties include synthetic compounds, naturally occurring compounds, and enzyme treatment. Because of the mechanisms of these chemicals, they are applied to the pulp, at most, shortly before the pulp is introduced into the machine chest or head box. Many synthetic strength aids involve charged materials, for example, anionic and cationic polyacrylamide treatments, which function to bridge fibers in order to hold them together to increase strength, drainage or retention. Time-sensitivity of application relative to the paper machine head box position is central to efficacy of polymeric treatments because electrical charge (present due to the charged materials) can be a fleeting, temporary effect. Charge chemistries are also weak and require a particular balance in application, so having too much time between chemical treatment and the actual formation of the sheet can be detrimental to strength development, drainage or retention. In most cases, the application of charge-based polymeric dry strength chemicals has been within or between a small number of process steps before the paper machine head box. These application points can include the inlet to the fan pump (the pump that delivers stock to the headbox), the machine chest (chest feeding the machine), the blend chest (before the machine chest), the final stock chests which feed into the blend chest (e.g., short and long fiber chests mixing into the blend chest), the repulper (the first step in taking fully dried or wet lapped pulp to low consistency), spraying chemicals on the forming wire or between sheet plies or onto the formed sheet or in a size press, or even in the machine, for example, spraying between sheet plies.

An example of a natural material which serves as a strength aid is starch. Starch and tree gums have a "glue-like" effect on the fibers. As with synthetic polymeric treatments, effective treatment with starch is dependent on the application site. Starch is typically applied to pulp shortly before the pulp is introduced into the paper machine either in the machine chest or the blend chest. However, it can also be applied on the machine after the pulp has undergone some process steps. For example, starch treatment can be employed by spraying starch on the sheet or between plies of multi-ply sheets for better bonding strength. In other applications, the starch strength treatment occurs after the sheet is fully formed and dried as the sheet passes through a vat to re-wet the sheet with a high concentration starch solution (e.g., in a size press).

The use of enzymatic treatments in the paper mill for the purposes of strength and drainage improvement has been investigated. Enzymes have been applied at or in the production line, shortly before introducing the pulp into the paper machine at similar points in the process to where mechanical and pre-machine chemical treatments can be applied. Examples are the machine chest, the blend chest, the post-fractionation chests, and even in the repulper at higher consistency. U.S. Pat. No. 6,066,233 to Olsen, et al. discloses treating ink free recycled fibers with an enzyme mixture (cellulose and pectinase) to achieve better drainage and produce a paper product with no loss in brightness. The treated recycled pulp was formed into paper product directly, i.e., there was no dewatering or wet-lapping or drying step between the enzymatic treatment and paper making. U.S. Pat. No. 5,110,412 to Fuentes, et al. discloses treating pulp with an enzyme such as a cellulase, hemicellulase or mixtures thereof. The pulp is treated with enzyme at the paper mill and then quickly used on the paper machine. U.S. Pat. No. 6,808,595 to Burns, et al. discloses treating fibers immediately before introducing the fibers into the paper machine with a hydrolytic enzyme to form aldehyde groups, and further treating with the hardwood fibers with a cross-linking agent and/or starch that forms bonds with the aldehyde groups for better strength and low linting during the tissue production. See also, U.S. Pat. No. 6,635,146 to Lonsky, et al. which discloses treating paper making fibers with a cellulolytic enzyme from 5,000 to about 200,000 ECU per kg of fibers prior to forming a paper sheet out of the treated pulp directly. U.S. Pat. No. 5,507,914 to Sarkar, et al. discloses treating pulp with a cellulolytic enzyme, refining the treated pulp, and then treating with a cationic polymeric coagulant and an anionic polymer at the vertical tank of the papermaking process. U.S. Pat. No. 6,939,437 to Hill, et al. discloses treating pulp in a paper mill with at least one cellulolytic enzyme and at least one cationic polymer before the paper machine.

The methods described above apply the enzymatic treatments at a point prior to introducing the pulp onto the paper machine or at some process steps in the paper mill shortly before the manufacturing of the paper. Thus, the pulp end user has to apply these treatments just before or during the paper making process. With respect to the wet lap or fully dried pulp, strength treatments in or immediately prior to the paper machine may not adequately compensate for the hornification which has occurred during the wetlapping or drying process and the storage and transportation time.

Thus, there is still a need for a method of treating pulp, or a method to treat wastepaper in the furnish collection or bailing process which is ultimately shipped to the recycling mill, to decrease the effect of hornification and storage time on pulp physical properties during wetlapping, drying, storage and transportation of the pulp.

It is therefore an object of this invention to provide a method for reducing the effects of wetlapping, drying, and hornification or deterioration of the pulp following the wet-lapping or drying process.

It is also an object of this invention to provide wet lapped and fully dried pulp with improved drainage and fiber strength.

SUMMARY OF THE INVENTION

Methods for reducing the effects of wetlapping, drying, and hornification of pulp fibers and consequently increasing the pulp drainage and strength properties in the final product (i.e., paper) are provided. The methods which have been developed creates a "value-added" product at the wastepaper dealer or processer or at the pulp and/or deinking mill, those being a wastepaper load or bale or wet lap or dried pulp treated with or impregnated with enzymes that will enhance the quality of the pulp product when it is rewetted and processed at the paper mill. The method of enhancing paper strength or pulp drainage in a virgin pulp mill or a recycled stock preparation plant includes the steps of administering an effective amount of enzyme formulation to either the wastepaper furnish at the wastepaper processing/baling facility or the wet pulp stock prior to dewatering and/or drying or directly to the dewatered or dried pulp prior to or after the wetlap machine or the pulp dryer, at the pulp plant, to treat the pulp prior to subsequent repulping for the manufacturing of paper products.

The enzyme may be administered to:
(1) wastepaper furnish at the furnish processing or baling site,
(2) wet pulp stock prior to the wet lap machine or pulp dryer, or
(3) wet lap pulp or dry lapped pulp after wet lapping or pulp drying while still in the deink plant or pulp plant In one embodiment, the method includes the steps of (1) treating virgin or deinked pulp in the deinking or pulping plant with an effective amount of one or more enzymes and, (2) dewatering the virgin or deinked pulp to obtain wet lap or fully dried pulp having reduced hornification and damage of the pulp. In a second embodiment, the method includes (1) treatment of virgin or recycled pulp immediately or shortly after the wetlapping or fully-drying process with an effective amount of one or more enzymes to produce a wet lap or fully dried pulp having reduced hornification and damage of the pulp for the eventual papermaker using that pulp. In this embodiment, the pulp is impregnated at the deink plant or pulp mill with the enzymes which will modify the pulp later. In a third embodiment, the method includes the steps of treating the dry wastepaper furnish paper or bales at the wastepaper collecting or packaging facility with an effective amount of one or more enzymes for later use in a wastepaper processing plant.

Enzymes that can be applied to treat pulp at the pulp mill, before the pulp is dried and shipped to a paper mill, include cellulases, hemicellulases, xylanases, pectinases, pectin esterases and pectin and pectate lyases or combinations thereof. The enzyme treated pulp may be further treated at the paper mill with different methods to improve drainage and strength. Additional treatments to improve drainage and strength include, but are not limited to, mechanical refining and application of starch, dry strength or wet strength polymers. The enzyme treatment is performed at a temperature from about 10° C. to about 90° C. at ambient atmospheric pressure. More preferably, the enzyme treatment is performed at a temperature range between 15° C. and 60° C. Higher temperatures are possible depending on which enzyme formulations are used. Applications can be in pulp stocks with pH ranging from 3.5 to 9.5. A pH range of 4.5 to 8.0 is preferable for most enzymes. The enzyme treatment is effective to increase the strength and/or drainage of the pulp compared to untreated pulps and consequently to improve the strength of sheets made from the enzyme-treated pulp when compared to sheets made from untreated pulp. Increases in pulp drainage may be demonstrated using the Schopper-Riegler or Canadian Standard Freeness tests and various laboratory drainage tests.

The enzyme treated or impregnated wet lapped or fully-dried pulp with improved drainage and fiber strength sells as a value added-product, having increased strength and/or drainage of the pulp and improved strength of sheets made from enzyme-treated pulp compared to untreated pulps and sheets made from untreated pulp.

Wastepaper loads or bales treated or impregnated with enzyme formulation effective to enhance drainage, strength and other pulp and paper properties in the paper making process are also provided. These are produced using the method of enhancing paper strength or pulp drainage during the waste paper loading or baling process by administering an effective amount of enzyme formulation to wastepaper loads or bales that are later used to produce recycled papers.

BRIEF DESCRIPTION OF THE DRAWINGS

FIG. 1 is a flow chart of the processing of pulp preparation in a virgin pulp mill or wastepaper recycling mill and a paper mill using the pulp stocks, showing points of enzyme treatment to collected wastepaper furnish or in the deink plant or pulp mill prior to the eventual repulping of wet lap or dried pulp at a paper mill.

DETAILED DESCRIPTION OF THE INVENTION

I. Definitions

Unless defined otherwise, all technical and scientific terms used herein have the same meanings as commonly understood by one of skill in the art to which the disclosed invention belongs. Publications cited herein and the materials for which they are cited are specifically incorporated by reference.

The term "deinking plant" refers to a plant or mill which processes wastepaper into a recycled pulp which can be used to manufacture paper either onsite or offsite. Deinking plants remove various contaminants such as inks, fillers, coatings, and stickier/adhesives from wastepaper and produce clean recycled pulp to be used either onsite or offsite at paper machines.

The term "effective amount" refers to any amount which results in a predetermined or desired outcome. For example, an effective amount of an enzyme formulation intended to enhance strength means the amount of enzyme formulation which is effective to increase fiber strength properties in the final sheet compared to pulps not treated with the same enzyme formulation under the same conditions.

The term "enzymatic fiber modification" refers to any alteration or modification of the pulp fibers as a result of interaction with an enzyme. The modification can either be a direct or indirect result of the enzyme treatment.

"Recycled pulp" or "recycled fibers" refers to the pulp or fiber stock components of a paper or paperboard furnish that is derived from recovered paper and paperboard or wastepaper.

"Drying" of the pulp does not include processing of the pulp on the paper machine. As used herein, drying of the pulp refers to drying pulp that is eventually re-pulped before being processed on a paper machine. "Once dried" and "fully dried" are used interchangeably.

"Wet lap" pulp refers to virgin or deinked recycled pulp which is not made directly into paper, but rather is dewatered and pressed down to a roughly 45-50% solid content product which is then stored or shipped in bale or crumb cube form for later use.

II. Enzyme Formulations

Enzyme formulations for treatment of pulp in the pulp mill or deink plant include one or more enzymes effective to increase fiber strength and/or modify drainage of the pulp. Examples of enzymes that can be used to treat pulp as described herein include, but are not limited to, cellulases, endo glucanases, cellobiohydrolases, hemicellulases, mannanases, xylanases, pectinases, gamanases, pectin and pectate lyases, lipases and laccases.

The enzymes are typically used in combination, although this is not essential and pulp may only be treated with one type of enzyme or one class of enzyme such as cellulases. In one embodiment, the enzymes are added in a concentration ranging from between 5 to 600 enzyme activity units per 100 g OD fiber. Preferably, the concentration of the enzymes is between 20 to 200 enzyme units/100 g OD of fiber. The enzyme units can be determined as described below.

Measurement of Cellulase (Endo-β-1,4-Glucanase) Activity (CMCU)

Endo-β-1,4-glucanases (EC 3.2.1.4) attack β-(1,4) linkages in amorphous cellulose, carboxymethylcellulose (CMC), and phosphoric acid-swollen cellulose, to produce shorter-chain cellooligosaccharides that in turn may be hydrolyzed to cellobiose and glucose by exo-glucanase and beta glucosidase. This method relies on degradation of CMC chains, which causes a measurable reduction in the viscosity of the CMC gum solution. The chemicals used to determine cellulase activity include 0.30% of sodium carboxymethyl cellulose (CMC) gum, AQUALON® CMC 7 (Hercules Incorporated, Wilmington, Del.) in pH 5.2 500 mM acetate buffer as the substrate and using CELLULAST® 1.5 L cellulase (Novozymes AIB, Denmark) as a standard cellulase with an activity of 20000 CMC Units/ml. A diluted enzyme sample or filtrate sample is mixed with 10.0 ml of gum solution for 10 minutes at 40° C. water bath and the viscosity is measured using Fisher Brand Glass Ubbelohde Viscometer Tubes. The reduction in viscosity is converted to CMC units based on the standard cellulase CELLULAST® 1.5 L.

Measurement of Amylase Activity (AU)

Amylase (EC 3.2.1.1) catalyzes the degradation of starch (amylose). An iodine-iodide indicator solution can be used to indicate starch concentration which is detected spectrophotometrically at 500 nm. The amylase activity is determined using potato starch as a substrate. This method is based on the break-down of starch and the reaction is followed by an iodine titration. The initial blackish-blue color is formed when starch solution is mixed with an iodine solution, and the blue color is reduced gradually into reddish-brown which is measured using a spectrophotometer at 500 nm. One amylase unit (AU) is defined as the amount of amylase which, under the standard testing conditions, (37° C., 10 minutes and pH 5.6 of 100 ppm starch solution), generates 1 micromole of glucose per minute.

Measurement of Lipase Activity (PCU)

The APC™ assay is based on an enzyme-coupled reaction. Triglycerides are first hydrolyzed by the lipases to glycerols and free fatty acids. The glycerols produced from the reactions react with adenosine triphosphate, glycerol kinase, and glycerol-peroxidase. A dye is formed which can be measured spectrophotometrically at 540 nm. The increase in absorbance at 540 nm is directly proportional to free glycerol concentration in the sample. A quantitative determination of enzyme activity is made by testing a known standard of lipase at multiple dilution rates to obtain a standard curve. The lipase activity is calculated by comparing the absorbance attained to a standard lipase of known activity. The lipase activity is determined using APC™ Method according to U.S. Pat. No. 7,067,244.

Measurement of Pectinase Activity (PU)

Pectinases break down 1.0% pectin solution (Sigma P-9135) with pH 5.0 acetate buffer at 50 mM and results in galacturonic acid (BioChemika 48280). The concentration of pectin in the solution is determined by measuring the content of galacturonic acid. The treatment of pectin solution with sulfuric acid will develop a color in the presence of carbazole (Sigma C-5132), which measured at 520 nm, is proportional to the total pectin concentration. One unit of pectinase activity is the amount of pectinase needed to produce one μmole of galacturonic acid at pH 5.0, temperature of 40° C. in 50 mM acetate buffer per minute.

Measurement of Xylanase Activity (XU)

The substrate employed is azurine-crosslinked wheat arabinoxylan. endo-1,4-β-D-xylanases hydrolyze the xylan backbone, releasing water soluble dyed fragments. The amount of released dyed fragments can be directly related to enzyme activity. The Xylazyme AX tablets are ordered from Megazyme International Ireland Ltd., Bray Business Park, Bray, Co. Wicklow, Ireland. The absorbance of these dyed fragments can be detected spectrophotometrically at 590 nm. A quantitative determination of enzyme activity is made by testing a known standard of xylanase at multiple dilution rates to obtain a standard curve. The standard curve correlates the enzyme activity of a known standard xylanase with absorbance. Novozymes Pulpzyme® HC has a standard activity unit of 40,000 XU/ml.

Measurement of Gamanase Activity (GU)

Gamanase breaks down galactomannans, such as bean gum, to reducing sugars which are measured with the DNS method. Locust bean gum at 0.1% (w/w) is used as the gamanase substrate. Enzyme is diluted with pH 6.8 50 mM phosphate buffer, added to the bean gum solution and incubated at 40° C. water bath for 20 minutes. Shake the samples well every 5-10 minutes and stop the reaction using 0.10 mL of 1M $Na_2CO_3$ solution, and then transfer 0.5 mL from each of the sample test tubes to glass test tubes to react with DNS solution and measure the absorbance at 575 nm. One unit of gamanase activity (GU/ml) is defined as the amount of enzyme generating 1 μmole of reducing sugar released from 0.1% locust bean gum at pH 6.8 and 40° C. per minute.

Measurement of Laccase Activity (LAMU)

Laccase units (LAMU) are based on the rate of oxidation of syringdazine. 1 LAMU is defined as the amount of enzyme which, under standard conditions, such as pH 7.5 and 30° C., oxidizes 1 μmole syringaldazine per minute. The laccase activity in LCU may also be determine using 2,2'-azino-bis(3-ethylbenzthiazoline-6-sulfonic acid) (ABTS) as the substrate at 25° C. and pH 4.5. One unit of enzyme activity is defined as the amount of enzyme oxidizing 1 μmole of ABTS per minute at temperature of 25° C. and pH 4.5.

The formulations can be provided in the form of a solution or granulated or powder enzymes that include compositions that adjust for pH and salt concentrations. In general, enzyme formulations can also include the appropriate buffer for optimal enzyme activity. One of skill in the art can optimize the conditions to maximize enzymatic activity using conventional techniques known in the art.

Commercially available enzyme formulations can also be applied in the method described herein. For example, Enzymatic Deinking Technologies (EDT), markets a line of products for fiber modification under the trade name of REFINASE®. REFINASE® products contain enzyme mixtures with at least one of the enzymes being a cellulase, endo-glucanase, cellobiohydrolase, hemicellulase, mannanase, xylanase, pectinase, pectin esterase, pectin and pectate lyase, gamanase, esterase, laccase or lipase. The dosage of the REFINASE® based on oven dried fiber or pulp ranges from 0.001% to 0.4%, with 0.025% to 0.15% based on OD fiber being more preferred.

In some embodiments the enzymes may be introduced in a dried, granulated, encapsulated, or pelletized form. Stabilizers such as metal ions and cationic polymers may optionally be added to the formulations. The enzyme formulations may be treated to improve storage stability. A method for producing solid granulates with improved storage stability is described for example U.S. Publication No. 2007/0111920 by Bauer, et al.

The formulations may additionally include one or more dispersants, which can be surfactants and/or polymers which may be used, for example, to enhance stability or activity of the enzymes.

III. Methods and Materials for Enzymatically Treating Pulp

Methods for reducing the effects of hornification and deterioration of pulp are described. The methods include treating virgin or recycled pulp at a pulp making plant, prior to transport to a paper making plant, with an enzyme formulation containing enzyme in an amount effective to increase pulp drainage characteristics of virgin pulp or recycled pulp and improve the strength of sheets made from the pulp. The various steps in the process of furnish collection and pulp stock preparation prior to making paper for both recycled and virgin paper are shown in FIG. 1.

In one embodiment, the pulp is treated with the enzyme formulation prior to drying into dry pulp (approximately 90-95% dry) or processing into wet lap pulp (approximately 45-50% dry). Prior to the drying or processing into wet lap pulp step refers to any time before the wetlap dewatering step used for wetlap pulps or the dewatering and drying steps involved in the production of dry pulps.

In a second embodiment, the enzyme formulation is applied to dry or wet pulp or impregnated into a bale of dried pulp or sheets of dried pulp. The dried pulp may be allowed to cool to a temperature at which the enzyme is not inactivated before administration or impregnation of the pulp. Enzyme is impregnated into the bales of pulp in a liquid or solid form at the pulp mill, prior to transport to the paper processing mill, either immediately after baling or after transport to a temporary storage facility. In this embodiment, there may be a period of a day, a few days, a week, a month, a few months, or longer prior to processing of the pulp at a paper product plant.

In a third embodiment, the enzyme formulation is applied to collected wastepaper furnish at the furnish processing or baling center prior to shipment to the paper recycling plant.

The pulp may optionally be treated with additives such as stabilizers and dispersants. These additives may be added alone or together with the enzymes at the same addition locations or separately at different locations.

The enzyme formulation is typically applied as a solution to the pulp stock but could also be added in dried or granulated enzyme form. Timing, concentration, temperature, pH and pulp consistency all play a role in pulp stock preparation. The stage of the process in which the enzyme treatment is applied can vary.

Treatment of Pulp with Enzyme Formulations

Several operating parameters in the pulp mill such as temperature or pH can be varied to alter the enzyme activity in order to modify pulp fiber characteristics such as drainage and physical properties.

Timing/Location of Enzyme Application

The point of the process in the pulp mill or deink plant at which the enzyme is applied is dependent on a variety of factors such as (1) the incubation time of the enzyme with the pulp; (2) the amount of time between the enzyme treatment and the drying or wet lapping step; (3) the amount of time between the drying or wet lapping of enzyme treated pulp and the time the pulp is used on a paper machine; and (4) the water loops in the pulp mill or deink plant. The incubation time of the enzyme with the pulp stock can vary. The pulp stock is treated with enzyme formulation for at least 1 minute, preferably more than five minutes, but the actual time can be for many months, while the pulp is in storage or transport, and the level of enzyme activity varies under the conditions of storage. Those skilled in addition of enzymes to warm, wet pulp stock will understand that the amount of enzyme activity will be substantially higher than when enzymes are provided in dry powder form to cooled, baled dry pulp in storage. The pulp is enzymatically treated for a period of time and in an amount and under conditions resulting in fiber modification and then the pulp is partially (i.e., formed into "wet-lap" pulp) or fully dried, then usually formed into bales. Alternatively, the wetlapped or dried pulp can be treated with enzyme after the wetlapping or drying process but while still in the pulp mill or deink plant. The dried pulp can be stored for at least up to three years before repulped and made into paper.

The enzyme treatment can be performed in tanks in the pulp mill before the final dewatering or drying step. Other equipment stages in which the methods can be performed include, but are not limited to, dump chests, bleach towers, feed tanks, high density towers, silo water, white water tanks and other parts of the mill where a minimum of 1 minute of contact time occurs or where process waters from the pre-drying or pre-wet lapping dewatering step return to a suitable part of the process for enzyme effect. Alternatively, the enzyme treatment in the deink plant or pulp mill can be applied after the wetlapping or drying step.

In preferred embodiments, the enzyme is administered to the wet pulp stock for at least 1 minute, preferably 5 minutes to 6 hours, and more preferably 10 minutes to 2 hours.

Temperature

It is well known in the art that enzyme activity is temperature and pH dependent. The enzyme treatments described herein are typically effective at temperatures of from 10° C. to 90° C. The more preferred temperature range is from about 15° C. to 60° C.

However, the temperature range can vary depending on the nature of the enzyme used and the optimal activity range for each enzyme.

pH

The pH of the pulp stock can generally be from about 3.5 to about 9.5 for most enzymes, more preferably from about 4.5 to 8.0. The pH of the stock can be adjusted using pH modifiers such as alum or aluminates, certain acids, carbon dioxide, and various alkalis such as sodium hydroxide.

Enzyme Concentration

The enzyme dosage depends on the specific enzyme and the other treatment conditions, in particular pulp consistency and temperature.

The enzymes may be used alone or in combination. The enzymes concentration preferably ranges between 5 to 600 enzyme units/100 g oven dried ("OD") fiber. Preferably, the concentration of the enzymes is between 20 to 200 enzyme units/100 g OD of fiber. The enzyme units can be determined as described herein. The effective amount of enzyme is that which results in increased fiber drainage of the pulp relative to non-enzyme treated pulp and/or which enhances paper sheet strength of the paper made using the enzyme treated pulp. The method can result in increases in both fiber drainage and paper sheet strength (for paper made from the pulp).

In preferred embodiments, the enzyme is administrated to the wet pulp stock with a consistency of 0.1% to 35%, preferably 0.5% to 15%, and more preferably 1.0% to 10%.

Determination of Pulp Strength

The enzymatically modified fibers can result in increased strength in the final paper product. Fiber strength can be determined using many different measures which conform to the strength needs of the paper grade. Certain grades such as tissue focus on machine direction and cross direction tensile strength targets. Fine printing and writing grades also require tensile strength standards but additionally focus on surface printing ability. Packaging grades require a broad assortment of strength parameters including tensile, tear, Mullen burst, ring crush, STFI/SCT test, Concora, plybond, sizing test or box crush tests. Each of these tests is conducted according to industry standard testing equipment and methods. Increased paper strength is any increase in paper strength over the standard or usual paper strengths achieved relative to untreated paper or paper treated with a method such as starch, chemical processing or refining. Paper strength can be measured using TAPPI test methods T494 (tensile strength), T403 (burst strength), T414 (tear strength), and other standardized industry procedures.

Determination of Pulp Drainage

Pulp drainage is determined by the rate and degree to which water drains from a pulp stock. Two of the most widely used tests are the Canadian Standard Freeness test and the European Schopper-Riegler test. One liter of 0.3% or 0.2% consistency pulp stock, respectively, is drained over a conical object and the quantity of water which passes through an overflow tube is monitored. A quick draining stock creates a large overflow and results in a high number of ml of filtrate passing over the cone as calculated by a Canadian Standard Freeness test. Alternate methods of tracking drainage use vacuum systems whereby the time rate and maximum degree of water removal from a pulp suspension are tracked. Improved drainage on a paper machine is noted by changes in flat box vacuums or couch roll vacuums or the position of dry lines on a Fourdrinier forming table. Additionally, improvements in drainage may be noted in reductions in final sheet moisture with all other factors (e.g., machine speed, vacuums, sheet grammage, drying section pressure) remaining constant.

Increased pulp drainage is any increase in pulp drainage over the standard pulp drainage achieved without enzyme treatment as described herein and with other drainage affecting measures being accounted for.

The enzymatically treated dried or wet lapped pulp is re-pulped at a paper mill before manufacturing paper. The re-pulping can be performed using any re-pulping methods known in the art.

IV. Pulp and Pulp Fibers

Wet lapped and dried pulp with improved drainage characteristics and improved fiber strength is obtained by treatment with an effective amount of an enzyme(s) to increase the strength and/or drainage of the pulp and improve the strength of sheets made from enzyme-treated pulp compared to untreated pulps and sheets made from untreated pulp.

The pulp and pulp fibers can be derived from any of a number of sources. Pulp can be made from wood, fiber crops or other non-wood sources such as wheat straw or rice straw or grass. Wood pulp comes from softwood and hardwood trees. Softwood trees include spruce, pine, fir, larch and hemlock. Hardwoods include eucalyptus, aspen and birch. One source of fiber that is widely used due to its lower cost and ready availability is the market eucalyptus pulp (e.g., South American, Australian, or Iberian varieties). Application of enzymatic treatments to eucalyptus pulps is especially beneficial due to the lower strength aspects of this short fiber, this fiber's lower cost, and the relative significant improvement from enzymatic treatment in terms of drainage and strength.

The pulp can be virgin pulp or recycled pulp. Virgin pulp is pulp that has never been made into a final paper product. Recycled pulp refers to pulp that was recycled from waste paper such as through a deinking process.

The consistency of the pulp stock to be enzymatically treated can be between about 0.1% and 35%, more preferably between 0.5% and 10%. Alternatively, enzyme treatment can be applied to wetlap or fully dried pulps in the pulp mill. Consistency is defined as the oven dry weight of the fiber divided by the total weight of the fiber and water in the stock suspension.

Currently, pulp is made and dried (partially or completely) in a pulp mill or deinking plant. The dried pulp is then used in a paper mill for processing into paper. In most instances, the pulp mill does not adjoin the paper mill where the paper machine is located, thus the pulp from the pulp mill must be transported to the paper mill for further processing. However, as a result of the distance between the pulp mill and the paper mill it is not feasible to transport a wet pulp stock supply of pulp ("never-dried pulp") for example, through a pipeline or in a large wet stock tank truck or rail car. Transport requires a more stable pulp product which can be stored economically for a long period of time as well as one which is not prohibitively expensive to transport. Wet pulp stock is significantly heavier than wet lap or fully dried pulp, and therefore significantly more expensive to transport. Therefore the pulp is fully or partially dried prior to transportation to the paper mill. In a preferred embodiment, the pulp is pulp that ultimately is dried and then re-pulped before the paper making process. In one embodiment, the pulp is mixed with the enzymes, as a powder or encapsulated in some sort of carrier, which then solubilizes and activates when the pulp is re-wetted prior to processing in the paper processing plant. Enzyme-treated virgin or recycled pulp can be dried to either wetlap (approximately 45-50% consistency or dry) or fully dried (approximately 90-95% dry) form.

Enzymatic fiber modification can result from increasing fibrillation of fibers resulting in more hydrogen bonds on the fiber and physical entanglement. Enzymatic fiber modification can also swell the outer layer of the fiber, reducing its density, and therefore making the fibers more "refining-able" resulting in more fibrils and delamination of outside fiber walls when processed through a mechanical refiner. Increases in drainage can occur due to the way in which the smaller micro fibrils from the enzyme treatment are produced or by certain changes to the colloidal phase of the pulp stock which enhances the water flow through the fibers.

In one embodiment, the enzyme fiber modification resulting in increased fiber drainage does not affect the paper sheet strength. In another embodiment the enzymatically treated pulp has both increased pulp drainage and paper sheet strength (for paper made from the pulp). It is possible that the enzyme modification does not affect fiber drainage but does improve paper sheet strength. Thus, the treatment affects drainage and strength individually and in combination.

The enzymatically treated dried or wet lapped pulp is re-pulped at a paper mill before manufacturing paper. The re-pulping can be performed using any re-pulping methods known in the art.

V. Wastepaper Loads or Bales Treated or Impregnated with Enzyme Formulation

Wastepaper loads or bales treated or impregnated with enzyme formulation effective to enhance drainage, strength and other pulp and paper properties in the paper making process can also be made by administering an effective amount of enzyme formulation to wastepaper loads or bales during the wastepaper collection that are later used to produce recycled papers. An enzyme formulation can be applied as solid or liquid to the surface, or more preferably, impregnated using high pressure nozzles to introduce the enzymes into the loads or bales.

The present invention will be further understood by reference to the following non-limiting examples.

EXAMPLES

Example 1

Impact of Enzymatic Treatment and Wet Lapping and Drying on Fully Bleached Kraft Hardwood Pulp Materials and Methods Experiments were conducted to determine the effect of enzyme, the effect of starch, and the wetlapping, drying and repulping on the treated pulp. The sheets were produced from the treated and control pulps with the similar conditions as follows: treatment temperature at 45° C., stock at about pH 6.4 with continuing mixing at 3.5% consistency for 45 minutes. The wet stock from the pulp mill was treated with enzyme alone and starch alone and the individually treated stocks are compared to non-treated stock. The non-treated stock, enzyme treated stock and starch treated stock were then split into two portions. The first portion was used for analysis as non-dewatered and dried stock. In this case the treated stock was measured for drainage and then sheets were made to measure sheet physical properties. The second portion was used for analysis of the post dewatering and drying impact of the treatment. The stock was dewatered with filter paper to about 25%, pressed at 50 psi for 2 minutes, and then dried on a speed dryer with surface temperature of 90-95° C. for 45 minutes. The dried pulp was then repulped with a disintegrator for 20 k revolutions with tap water for drainage and then made into a sheet to determine the effect of wetlapping, drying and repulping following either enzyme or starch treatment or a no-treatment control. Hand sheets were made, conditioned and measured according to TAPPI T402, T205, T220, T403, T220 and T411.

Results

Table 1 shows the effect on drainage and sheet strength of an enzyme blend, Refinase® A alone, starch alone, and no treatment, followed by wet lapping and drying process.

TABLE 1

Effect of enzymes and starch on drainage and strength properties of fully bleached Kraft hardwood pulp.

| Physical properties | Treatment conditions | Control | Refinase ®, 0.05% | Starch, 2.0% |
|---|---|---|---|---|
| Freeness, ml | Never-dried | 635 | 673 | 598 |
| | Wet-lapped, dried and repulped | 607 | 647 | 610 |
| Burst, kPa · m$^2$/g | Never-dried | 2.0 | 2.8 | 2.4 |
| | Wet-lapped, dried and repulped | 1.2 | 1.6 | 1.0 |
| Tensile, N · m/g | Never-dried | 37.8 | 46.8 | 39.8 |
| | Wet-lapped, dried and repulped | 24.2 | 28.5 | 19.7 |

The term "Never-dried" above refers to no interim dewatering or wetlapping/drying step of the wet virgin Kraft eucalyptus pulp stock directly from the pulp mill prior to sheet manufacturing. The "Dewatered, dried and re-pulped" above refers to the processing of the pulp which was wet-lapped using filtration, dried and repulped following enzyme or starch treatment of the "Never-dried" wet pulp stock.

Treatment of never-dried pulp with starch improved the strength properties of pulp when compared to untreated pulp. The positive effect of the starch on strength did not carry through the wet-lapping and drying process. By contrast, enzyme treatment improved strength properties of treated pulp, even for pulp after the wet-lapping and drying process. As shown in Table 1, the enzymatic treatment is beneficial for improved drainage and fiber properties for many types of paper production.

Example 2

Impact of Enzymatic and Starch Treatment on Deinked Pulp Stock

Materials and Methods

A similar set of experiments as described in Example 1 was conducted on deinked pulp stock taken from the end of the deink plant where mixed office waste paper was a major furnish component. The deinked pulp was very clean with very low residual dirt. Its brightness was about 75% ISO. The deinked pulp was treated similarly as the virgin hardwood pulp used in Example 1.

Results

The results are shown in Table 2.

TABLE 2

Effect of enzymes and starch on drainage and strength of deinked pulp stock

| Physical properties | Treatment conditions | Control | Refinase ®, 0.05% | Starch, 1.0% |
|---|---|---|---|---|
| Freeness, ml | Never-dried | 466 | 531 | 415 |
| | Dewatered, dried and repulped | 438 | 524 | 485 |
| Burst, kPa · m$^2$/g | Never-dried | 2.8 | 3.2 | 3.1 |
| | Dewatered, dried and repulped | 2.3 | 2.7 | 2.2 |
| Tensile, N · m/g | Never-dried | 43.7 | 51.6 | 47.6 |
| | Dewatered, dried and repulped | 33.3 | 38.3 | 32.9 |

The dewatering, drying and repulping once again showed significant deterioration in pulp properties in terms of drainage and physical strength. The enzymatic treatment showed improvements in stock drainage and sheet strength compared to control results for both the never-dried and post-dewatering/drying treatments. By contrast, starch treatment alone was not effective in improving pulp drainage or strength properties of the resulting sheets produced after dewatering and drying.

Example 3

Impact of Enzymatic Treatment of Fully Bleached Kraft Loblolly Pulp

Materials and Methods

A wet pulp stock at about 3.6% consistency was collected from a southern Kraft pulp mill which makes bleached dry lap commercial products. The wet pulp stock was treated in a similar manner as described in Example 1 for hardwood pulp using Refinase® B at 0.05% based on OD fiber.

Results

The results are shown in Table 3.

TABLE 3

Effect of enzyme on bleached Loblolly Kraft pulp

| Physical properties | Treatment conditions | Control | Refinase ®, 0.05% | Starch, 1.0% |
|---|---|---|---|---|
| Freeness, ml | Never-dried | 682 | 729 | 589 |
| | Dewatered, dried and repulped | 665 | 728 | 683 |
| Burst, kPa · m$^2$/g | Never-dried | 2.7 | 3.1 | 3.0 |
| | Dewatered, dried and repulped | 1.9 | 2.4 | 2.1 |
| Tensile, N · m/g | Never-dried | 32.2 | 37.7 | 36.1 |
| | Dewatered, dried and repulped | 24.2 | 28.4 | 22.1 |

As in examples 1 and 2, the enzymatic treatment of never-dried pulps provided material gains to drainage and strength which carried through the dewatering and drying process as compared to the non-treated control. As in the other examples, the starch treatment prior to dewatering and drying failed to provide improvements in drainage of the post dewatered and dried pulp and the strength tests were inferior to those from the enzymatic treatment.

The methods described herein can be employed at a pulp mill to produce wet lapped or dried pulp for later use. This would be beneficial in view of the geographically dispersed users of the virgin and market deinked pulps.

Those skilled in the art will recognize, or be able to ascertain impact using no more than routine experimentation and equivalents to the specific embodiments of the invention described herein. Such equivalents are intended to be encompassed by the following claims.

We claim:

1. A method of modifying virgin pulp properties comprising administering, in a virgin pulp mill, an effective amount of an enzyme formulation comprising one or more enzymes to virgin pulp after bleaching of the pulp and prior to drying and dewatering of the pulp to form dried pulp, wetlap pulp, market pulp sheets, bales of market pulp sheets, or dried crumbled pulp to treat the pulp for the manufacturing of paper products, wherein the treated pulp is not processed at a paper making plant for a week or longer after administration of the enzyme formulation, wherein the administered enzyme formulation is effective to increase pulp drainage characteristics of the treated pulp when repulped a week or longer after administration of the enzyme formulation, or improve strength when sheets are made from the treated pulp a week or longer after administration of the enzyme formulation, or both; and wherein the one or more enzymes comprise at least one cellulase, at least one pectinase, and at least one enzyme selected from the group consisting of endoglucanases, cellobiohydrolases, hemicellulases, mannanases, xylanases, gamanases, pectin lyases, pectate lyases, lipases, and laccases.

2. The method of claim 1, wherein the enzyme formulation is administered as a liquid or solid.

3. The method of claim 1, wherein the enzyme formulation is administered as a powder, dried, granulated, encapsulated, or pelletized form.

4. The method of claim 1, wherein the enzyme formulation is dosed with enzyme activity ranging from about 5 to 600 units of enzymatic activity per 100 gram oven dried fiber.

5. The method of claim 1, wherein the enzyme formulation is administered at a temperature in the range of about 10° C. to 90° C.

6. The method of claim 1, wherein the enzyme formulation is administered at a pH range of about 3.5 to 9.5.

7. The method of claim 1, wherein the enzyme formulation is administered into the pulp when the pulp has a consistency of 0.1% to 35%.

8. The method of claim 1, wherein the enzyme formulation is dosed with enzyme activity ranging from about 20 to 200 units per 100 grams of oven dried fiber.

9. The method of claim 1, wherein the enzyme formulation is administered at a temperature in the range of about 15° C. to 60° C.

10. The method of claim 1, wherein the enzyme formulation is administered at a pH range of about 4.5 to 8.0.

11. The method of claim 1, wherein the enzyme formulation is administered into the pulp when the pulp has a consistency of 0.5% to 15%.

12. The method of claim 1, wherein the enzyme formulation is administered into the pulp when the pulp has a consistency of 1.0% to 10%.

13. The method of claim 1, wherein the pulp drainage characteristics comprise the rate and degree to which water drains from the pulp.

14. The method of claim 13, wherein the rate and degree to which water drains from the pulp is measured by the Canadian Standard Freeness test.

15. The method of claim 1, wherein the pulp drainage characteristics are increased over the same pulp drainage characteristics of pulp to which the enzyme formulation was not administered.

16. The method of claim 1, wherein the pulp drainage characteristics are increased by 5% over the same pulp drainage characteristics of pulp to which the enzyme formulation was not administered.

17. The method of claim 1, wherein the strength in the sheets is measured using TAPPI test methods T494 (tensile strength), T403 (burst strength), T414 (tear strength), or a combination.

18. The method of claim 1, wherein the strength in the sheets is improved over the strength in sheets made from pulp to which the enzyme formulation was not administered.

19. The method of claim 1, wherein the tensile strength in the sheets is improved by 23% over the tensile strength in sheets made from pulp to which the enzyme formulation was not administered.

20. The method of claim 1, wherein the pulp drainage characteristics are increased over the same pulp drainage characteristics of pulp to which the enzyme formulation was not administered, or the strength in the sheets is improved over the strength in sheets made from pulp to which the enzyme formulation was not administered, or both.

21. The method of claim 1, wherein the pulp comprises eucalyptus pulp.

22. The method of claim 1, wherein the sheets with improved strength are tissues or towels.

23. The method of claim 1, wherein the sheets with improved strength are printing papers, writing papers, or paperboard.

* * * * *